US009971954B2

United States Patent
Nagato et al.

(10) Patent No.: US 9,971,954 B2
(45) Date of Patent: May 15, 2018

(54) APPARATUS AND METHOD FOR PRODUCING IMAGE PROCESSING FILTER

(71) Applicant: FUJITSU LIMITED, Kawasaki-shi, Kanagawa (JP)

(72) Inventors: Tsuyoshi Nagato, Isehara (JP); Tetsuo Koezuka, Hachiouji (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 14/967,456

(22) Filed: Dec. 14, 2015

(65) Prior Publication Data

US 2016/0098615 A1 Apr. 7, 2016

Related U.S. Application Data

(63) Continuation of application No. PCT/JP2014/066252, filed on Jun. 19, 2014.

(30) Foreign Application Priority Data

Jul. 2, 2013 (JP) .................................. 2013-138593

(51) Int. Cl.
  *G06K 9/00* (2006.01)
  *G06K 9/48* (2006.01)
  (Continued)

(52) U.S. Cl.
  CPC .................. *G06K 9/48* (2013.01); *G06K 9/46* (2013.01); *G06N 3/126* (2013.01); *G06T 7/0004* (2013.01);
  (Continued)

(58) Field of Classification Search
  CPC . G06K 9/48; G06K 9/46; G06N 3/126; G06T 7/0004; G06T 7/60;
  (Continued)

(56) References Cited

U.S. PATENT DOCUMENTS 8,687,879 B2 * 4/2014 Cotman ............. G06K 9/00127
  382/156
8,798,937 B2 * 8/2014 Schaffer .................. G06F 19/20
  702/20

(Continued)

FOREIGN PATENT DOCUMENTS

JP 2007-34719 2/2007
JP 2010-26945 2/2010

(Continued)

OTHER PUBLICATIONS

Naife, R.M., and Abass, H.H., Optimal Edge Detection Filter Using Genetic Algorithm, 2015, Journal of Kerbala University, vol. 13, No. 1, pp. 149-160.*

(Continued)

*Primary Examiner* — Jonathan S Lee

(74) *Attorney, Agent, or Firm* — Fujitsu Patent Center

(57) ABSTRACT

In order to produce an image processing filter by utilizing genetic programming, a taught parameter acquiring unit acquires a taught parameter indicating a feature shape in an input image before processing. A data processing unit creates an output image by processing the input image with an image processing filter, and subsequently a feature extracting unit extracts a detected parameter indicating a feature shape in the output image. An automatic configuring unit evaluates the image processing filter by calculating cosine similarity between the taught parameter and the detected parameter.

10 Claims, 9 Drawing Sheets

(51) Int. Cl.
*G06N 3/12* (2006.01)
*G06K 9/46* (2006.01)
*G06T 7/00* (2017.01)
*G06T 7/60* (2017.01)
*G06T 7/10* (2017.01)

(52) U.S. Cl.
CPC .................. *G06T 7/10* (2017.01); *G06T 7/60* (2013.01); *G06T 2207/10004* (2013.01); *G06T 2207/20061* (2013.01); *G06T 2207/20081* (2013.01); *G06T 2207/30108* (2013.01)

(58) Field of Classification Search
CPC . G06T 2207/10004; G06T 2207/20061; G06T 2207/20081; G06T 2207/30108
See application file for complete search history.

(56) References Cited

U.S. PATENT DOCUMENTS

| | | | | |
|---|---|---|---|---|
| 2008/0069399 | A1* | 3/2008 | Nagao | G06T 7/215 382/103 |
| 2010/0138026 | A1* | 6/2010 | Kaushal | G05B 13/0265 700/104 |
| 2011/0131162 | A1* | 6/2011 | Kaushal | G05B 13/0265 706/13 |
| 2013/0141273 | A1* | 6/2013 | Cooper | G01S 13/9035 342/25 F |
| 2014/0063221 | A1* | 3/2014 | Mohanakrishnan | G06K 9/00597 348/78 |
| 2014/0198986 | A1* | 7/2014 | Marchesotti | G06F 17/30274 382/190 |
| 2015/0116353 | A1* | 4/2015 | Miura | G06T 11/60 345/632 |
| 2015/0363660 | A1* | 12/2015 | Vidal | G06F 17/30277 382/173 |
| 2016/0045109 | A1* | 2/2016 | Tsou | A61B 3/113 351/208 |

FOREIGN PATENT DOCUMENTS

| | | |
|---|---|---|
| JP | 2011-14051 | 1/2011 |
| JP | 2013-127716 | 6/2013 |

OTHER PUBLICATIONS

Chatterjee, Snehamoy, and Ashis Bhattacherjee. "Genetic algorithms for feature selection of image analysis-based quality monitoring model: an application to an iron mine." Engineering Applications of Artificial Intelligence 24.5 (2011): 786-795.*
Colton, Simon, and Pedro Torres. "Evolving approximate image filters." Applications of Evolutionary Computing (2009): 467-477.*
Kowaliw, Taras, et al. "Evolving novel image features using genetic programming-based image transforms." Evolutionary Computation, 2009. CEC'09. IEEE Congress on. IEEE, 2009.*
Tirronen, Ville, et al. "An enhanced memetic differential evolution in filter design for defect detection in paper production." Evolutionary Computation 16.4 (2008): 529-555.*
International Search Report and Written Opinion of the International Searching Authority (Form PCT/ISA/210, Form PCT/ISA/237), mailed in connection with PCT/JP2014/066252 and dated Sep. 22, 2014 (8 pages).
JPOA—Office Action dated Apr. 4, 2017 for corresponding Japanese Application No. 2013-138593, with full machine translation.

* cited by examiner

APPARATUS AND METHOD FOR PRODUCING IMAGE PROCESSING FILTER

CROSS-REFERENCE TO RELATED APPLICATIONS

This application is a continuation application of International Application PCT/JP2014/066252 filed on Jun. 19, 2014 which designated the U.S., which is based upon and claims the benefit of priority of the prior Japanese Patent Application No. 2013-138593 filed on Jul. 2, 2013, the entire contents of which are incorporated herein by reference.

FIELD

The embodiments discussed herein relate to an apparatus and a method for producing an image processing filter.

BACKGROUND

Checking an exterior appearance of an industrial product involves capturing an image of the exterior appearance of the industrial product with an image capturing device and determining whether or not there is a defect thereon. Here, in the field of factory automation (FA), noise generated in an image capturing environment, as well as fluctuation of shadow and brightness, often affects the captured image. Thus, it is desirable that an image processing algorithm extract a defect portion robustly against environmental change. Also, when an appearance checking device is operated to check an exterior appearance of an industrial product, the image processing algorithm is sometimes to be reconstructed because of change in checking environment, such as change of check target and improvement of the appearance checking device. Hence, the appearance checking device needs to be capable of reconstructing its image processing method easily.

An image processing apparatus in the appearance checking device creates an output image by processing an image captured by a camera or the like with an image processing filter. Here, it is known that the conventional image processing apparatus produces an image processing filter by performing evolutionary computation based on genetic programming. The genetic programming models a procedure of biological evolution to execute a crossover process and a mutation process on a tree-structured image processing filter, for the purpose of generating a plurality of new image processing filters. An initial image processing filter is replaced by a new image processing filter of high fitness, and the aforementioned procedure is repeated to change generations of image processing filters, until an optimal image processing filter is found.

Such conventional image processing filter producing process includes an image processing filter selecting process in which an image region that is specified by a worker is processed. A plurality of image processing filters are used to process an image. Then, a plurality of output images processed by the image processing filters are displayed on a display, so that the worker can select a preferable output image from among them. Then, the image processing filter that has produced the image selected by the worker is subjected to an evolution process.

See, for example, Japanese Laid-open Patent Publication No. 2010-26945.

In the conventional image processing filter producing process, a worker confirms output images after filtering process to select an image processing filter. That is, the fitness of an image processing filter is judged by comparing images or their pixels before and after the filtering process of the image processing filter. However, when images or their pixels are compared between before and after the filtering process, variation of edge line widths after the filtering process and an error in teaching may decrease the fitness of the image processing filter even if the image processing filter leads to an effective output result. Hence, in a conventional fitness calculating method, an effective process may be dropped out of selection through optimization by genetic programming, in some cases.

SUMMARY

According to one aspect, there is provided an image processing filter producing apparatus including: a computing unit configured to perform a procedure including: producing a new image processing filter by genetically evolving an image processing filter for processing an input image, acquiring a first parameter that identifies a shape included in the input image, producing an output image by processing the input image with the new image processing filter, acquiring a second parameter that identifies a shape included in the output image, and calculating a fitness of the new image processing filter by comparing the first parameter with the second parameter.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
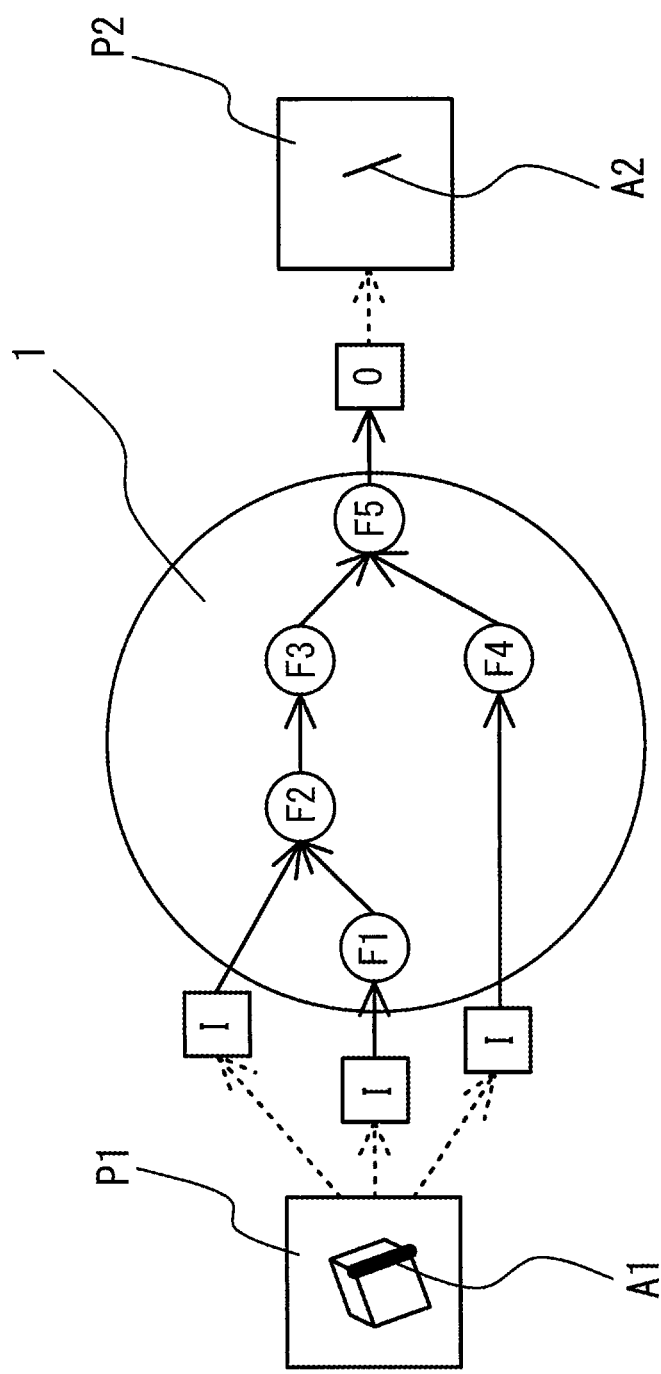
FIG. 1 describes an example of an image processing filter according to an embodiment of the present disclosure.

An embodiment will be described below with reference to the accompanying drawings, wherein like reference numerals refer to like elements throughout. A purpose and advantage of an embodiment are achieved by elements and their combinations described in the claims specifically. The aforementioned general description and the below detailed description are just for describing typical examples, and do not limit the present embodiment. First, the principle of an embodiment will be described.

A purpose of this embodiment is to acquire an output image that is similar to a target image, by processing an input image with a robust image processing filter produced by using genetic programming. The output image is used to extract a feature of a subject and a feature region in the input image, for example. This image processing is applied to an automation technology of appearance check in the field of factory automation, for example. Note that this embodiment can also be used in a field other than the aforementioned technology.

As illustrated in FIG. 1, an image processing filter 1 includes a tree structure having a large number of nodes. For example, the tree structure of the image processing filter 1 illustrated in FIG. 1 includes three leaf nodes I for inputting an input image P1 before image processing. Further, the tree structure of the image processing filter 1 includes one root node O for outputting an output image P2 after image processing. Also, the tree structure of the image processing filter 1 includes a plurality of nodes F1 to F5 between the leaf nodes I and the root node O. Each of the nodes F1 to F5 is a predetermined program module or an arithmetic expression. FIG. 1 illustrates an example in which a straight line A1 in the input image P1 is converted to a straight line A2 by the image processing filter 1. Note that the structure of the image processing filter 1 is not limited to what is illustrated in FIG. 1.

Figure 2:
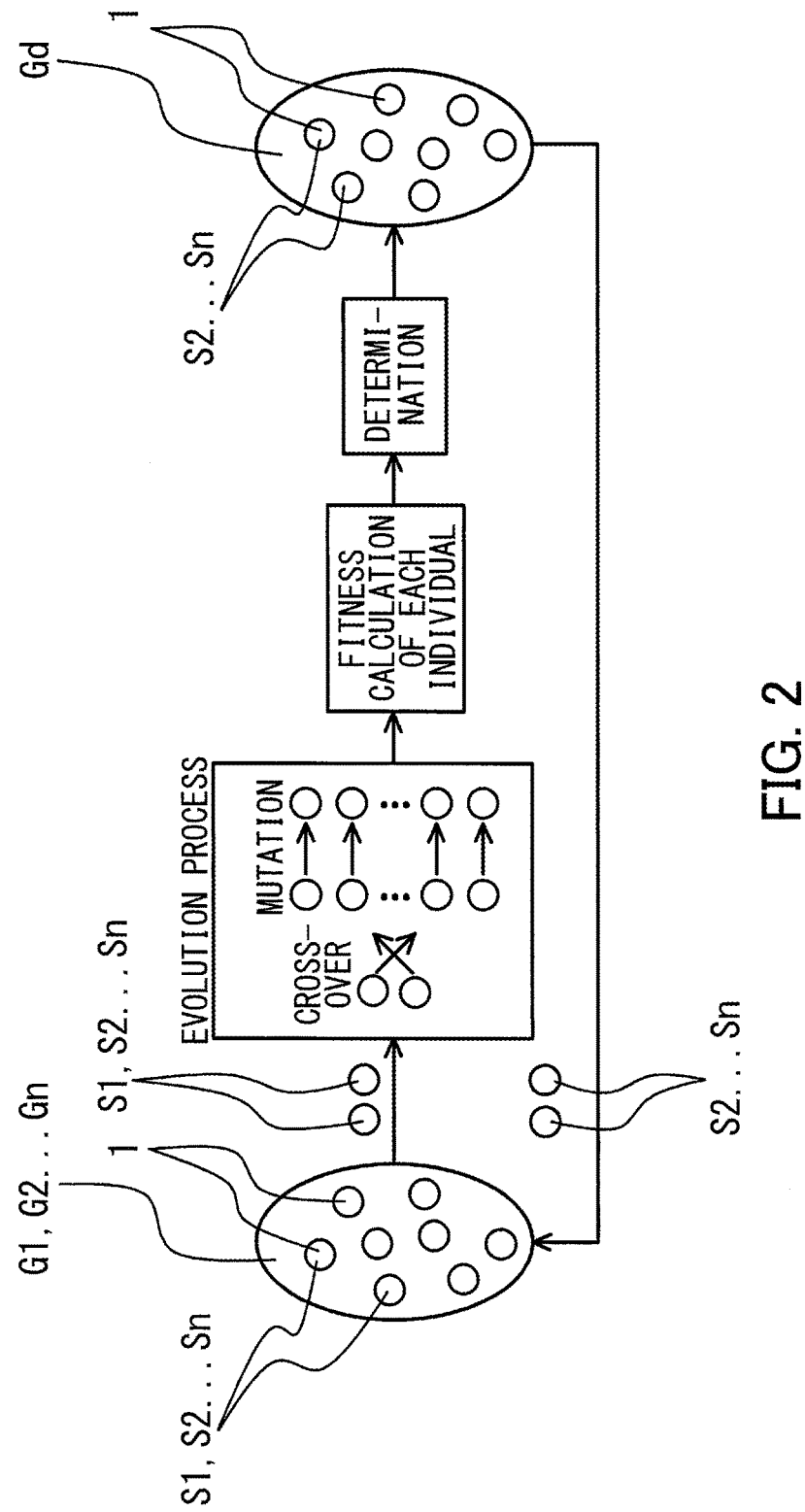
FIG. 2 describes an example of a principle of an image processing filter producing method according to an embodiment of the present disclosure.

Next, following description will explain a concept of a method for optimizing a tree structure of an image processing filter in such a manner to increase its fitness to a targeted purpose by using genetic programming, with reference to FIG. 2.

First, an individual group G1 including initial individuals S1 of image processing filters 1 is created. A predetermined number (for example, 8) of image processing filters 1 are created as the initial individuals S1 by a predetermined method. Subsequently, two individuals S1 (image processing filters 1) are taken out at random from the individual group G1 of the image processing filters 1, in order to generate new individuals S2 (image processing filters 1) through an evolution process. In the evolution process, at least a part of the tree structure of each individual S1 is changed by crossover or mutation. How to operate crossover, how to operate mutation, and an event probability of mutation are set in advance. The fitness of each individual S2, which is newly generated by the evolution process, is calculated in a fitness calculation process. The fitness is calculated by comparing a feature value of an image created by each individual S2 with a feature value of the input image P1 calculated in advance.

Subsequently, a determination process is performed to determine whether the fitness has become equal to or larger than a threshold value. If the fitness has become equal to or larger than the threshold value, it is assumed that a robust image processing filter has been produced successfully, and the process ends. On the other hand, if the fitness is less than the threshold value, a predetermined number (for example, two) of individuals S2 are extracted from an individual group Gd including the individuals S2 generated in the evolution process, and replaces individuals S1 in the initial individual group G1. The extracted individuals S2 are decided by a best individual selection method and a roulette selection method, for example. In an exemplary extraction method of individuals S2, one individual is extracted by the best individual selection method, and another individual is extracted by the roulette selection method.

As described above, the new individuals S2 are produced by evolving a part of the individuals S1 belonging to the initial individual group G1, and a part of the initial individual group G1 is replaced by new individuals S2, in order to produce the individual group G2 of the second generation. Thereafter, the aforementioned process is performed on the individual group G2 of the second generation, in order to produce an individual group G3 of the third generation. Subsequently, the same process is repeated a predetermined number of times (for example, times) to change generations a plurality of times, and thereafter an individual Sm of high fitness is acquired as the image processing filter 1.

Figure 3:
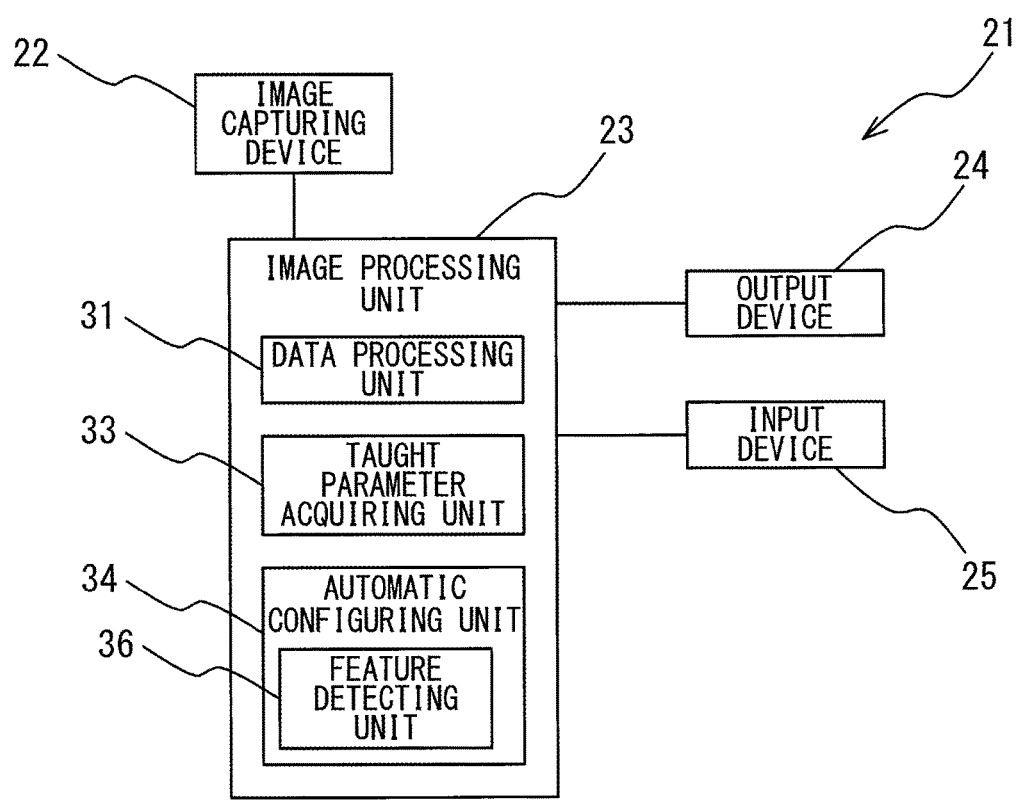
FIG. 3 is a block diagram illustrating an example of a schematic configuration of an image processing apparatus including an image processing filter producing apparatus according to an embodiment of the present disclosure.

Next, a device configuration for realizing the aforementioned principle will be described with reference to FIG. 3. An image processing apparatus 21 forms a part of an appearance checking device for checking an exterior appearance of a product, and includes an image capturing device 22 for capturing images, an image processing unit 23, an output device 24, and an input device 25. The image capturing device 22 outputs data of a captured image to a data processing unit 31 of the image processing unit 23. The output device 24 is, for example, a display, a printer, or a device for writing data into a storage medium. The input device 25 is, for example, a keyboard and a mouse. Note that the image processing apparatus 21 may include the image processing unit 23 only. Also, the image processing apparatus 21 may form another device or a part of another device. Further, the image processing apparatus 21 may be configured by causing a general-purpose computer to execute an image processing filter producing program.

The image processing unit 23 serves as a device for processing images and a device for producing an image processing filter 1, and includes the data processing unit 31, a taught parameter acquiring unit 33, and an automatic configuring unit 34. The data processing unit 31 processes an image captured by the image capturing device 22 to create an input image P1, and creates an output image P2 using an image processing filter 1. Also, the image processing unit 23 includes the taught parameter acquiring unit 33 and the automatic configuring unit 34 as functions that characterizes this embodiment. The taught parameter acquiring unit 33 is used in a process in which a worker uses the input device 25 to specify a region from which a taught parameter is extracted as a first parameter indicating a feature value of an input image P1, and a process for extracting a taught parameter. The automatic configuring unit 34 generates an image processing filter 1 on the basis of genetic programming. Further, the automatic configuring unit 34 includes a feature detecting unit 36 for detecting a detected parameter as a second parameter indicating a feature value of an output image P2.

Figure 4:
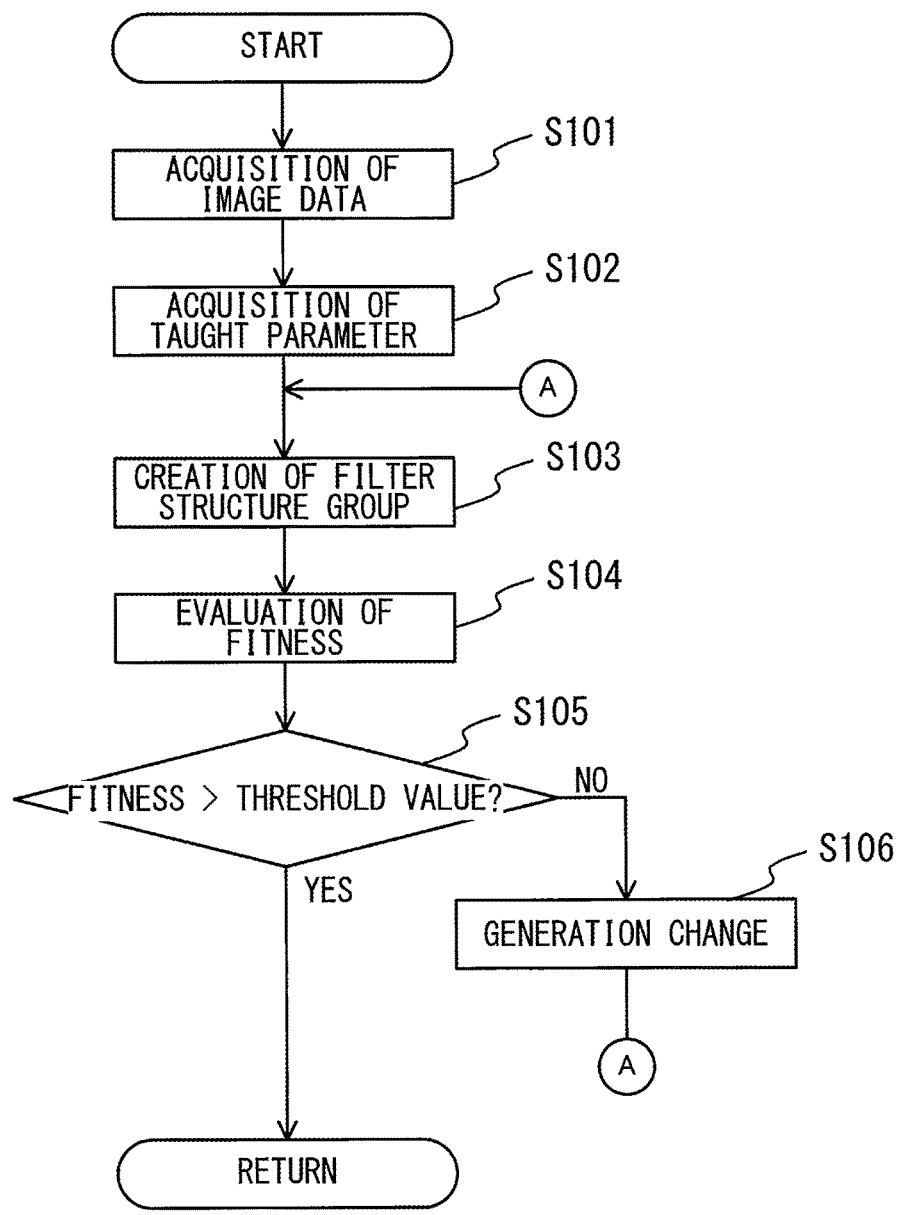
FIG. 4 is a flowchart illustrating an example of the image processing filter producing method according to an embodiment of the present disclosure.

Next, with reference to the flowchart of FIG. 4, a process of the image processing apparatus 21 will be described. First, in step S101, the data processing unit 31 uses the image capturing device 22 to acquire image data of an input image P1. In subsequent step S102, the taught parameter acquiring unit 33 extracts a feature value of the input image P1 to acquire a taught parameter. Thereafter, in step S103, the automatic configuring unit 34 creates an initial individual group G1 of image processing filters 1. In step S104, the fitness of each image processing filter 1 is evaluated on the basis of the taught parameter and a detected parameter. Here, as illustrated in step S105, if the fitness exceeds a threshold value, the image processing filter 1 is employed, and the process ends. In this case, an image captured by the image capturing device 22 is processed using the produced image processing filter 1, and output to the output device 24. In contrast, if the fitness is equal to or smaller than the threshold value in step S105, the process proceeds to step S106 to change generations. Thereafter, the process returns to step S103 from terminal A to generate an individual group G2 of new image processing filters 1. Here, step S104 corresponds to the fitness calculation process for each individual of FIG. 2. The determination process of step S105 corresponds to the determination process of FIG. 2. Generation change of step S106 corresponds to the evolution process illustrated in FIG. 2, and changes at least a part of the tree structure of each individual S1 by crossover and mutation. Then, when the process returns to step S103 from step S106, two individuals S1 are extracted from the individual group Gd of FIG. 2 by the best individual selection method or other selection method, in order to form an individual group G2, for example. By repeating steps S103 to S106, the generation of the image processing filters 1 is changed in such a manner to optimize image processing filters 1.

Figure 5:
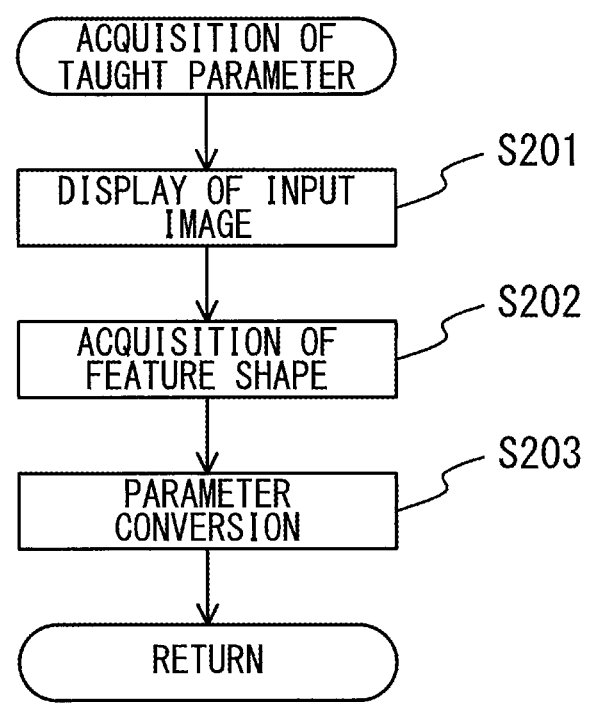
FIG. 5 is a flowchart illustrating an example of a feature parameter teaching process in the image processing filter producing method according to an embodiment of the present disclosure.

Next, with reference to FIG. 5, the detail of the parameter teaching process of step S102 will be described.

First, in step S201, the image processing apparatus 21 displays the input image P1 on the output device 24. Subsequently, in step S202, the taught parameter acquiring unit 33 acquires a feature shape in the input image P1. The feature shape is acquired, for example, when a worker selects a region in the input image P1 displayed on the output device 24 by means of the input device 25. Then, in step S203, the taught parameter acquiring unit 33 extracts a taught parameter as information that identifies the feature shape of the input image P1.

Figure 6A:
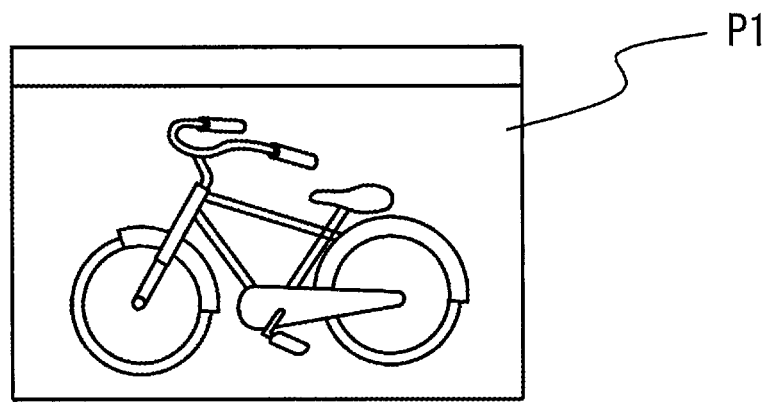
FIG. 6A illustrates an example of an image used in the feature parameter teaching process according to an embodiment of the present disclosure.
Figure 6B:
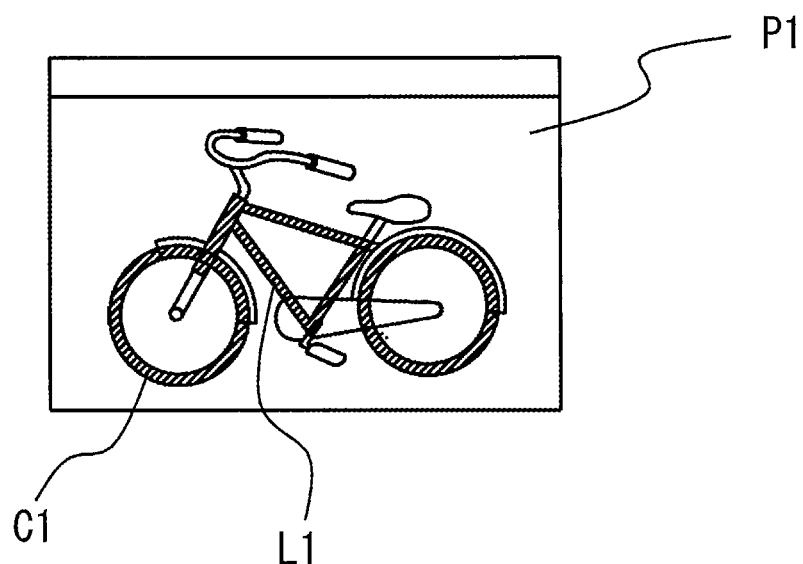
FIG. 6B describes an example of a state in which a worker has taught a feature shape in the feature parameter teaching process according to an embodiment of the present disclosure.

Here, with reference to FIG. 6A and FIG. 6B, a specific example of the parameter teaching process of step S102 will be described. When the input image P1 illustrated in FIG. 6A is captured, a worker uses the input device 25, such as a mouse, to utilize a graphical user interface (GUI) that is provided on the display of the output device by the taught parameter acquiring unit 33, for the purpose of tracing straight lines and circles in the image. With this work, a feature shape including straight lines and circles is identified, as illustrated in FIG. 6B. The taught parameter acquiring unit 33 displays the feature shape in the input image P1 in an emphasized manner, so as to allow the feature shape to be confirmed easily. For example, the feature shape includes a straight line L1 and a circle C1. Note that the feature shape is not limited to a straight line and a circle. Also, the number of feature shapes is not limited to two, but may be one or three or more.

Figure 7A:
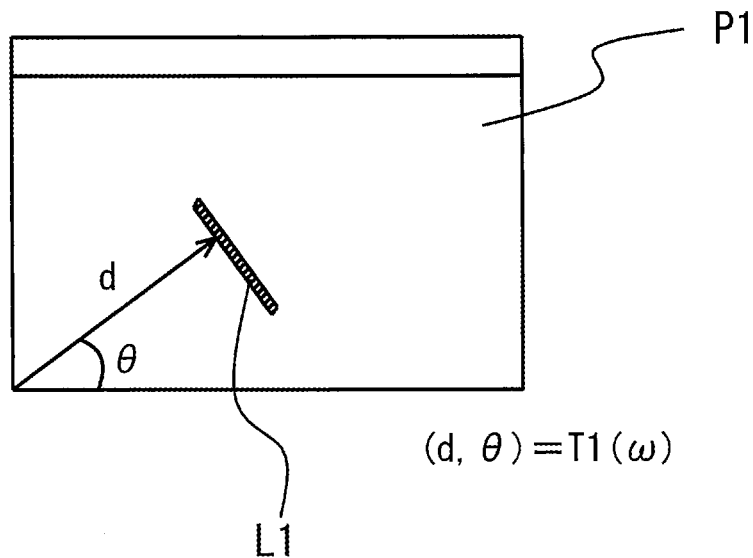
FIG. 7A describes an example of a process of extracting a taught parameter from a feature shape taught by a worker in the feature parameter teaching process according to an embodiment of the present disclosure.

The taught parameter acquiring unit 33 extracts a taught parameter $Tn(\omega)$ (here, n is a positive integer) from a collection of pixel coordinates that correspond to the straight line and the circle input by the worker. For example, as illustrated in FIG. 7A, when the feature shape is the straight line L1, the taught parameter acquiring unit 33 creates a straight line using an approximate expression based on the collection of pixels specified by the worker. Then, a position in the image (for example, a distance d from reference coordinates and a slope $\theta$ of a straight line passing through the reference coordinates) is extracted as a parameter characterizing the straight line, and a taught parameter $T1(\omega)$ is calculated based on such data.

Figure 7B:
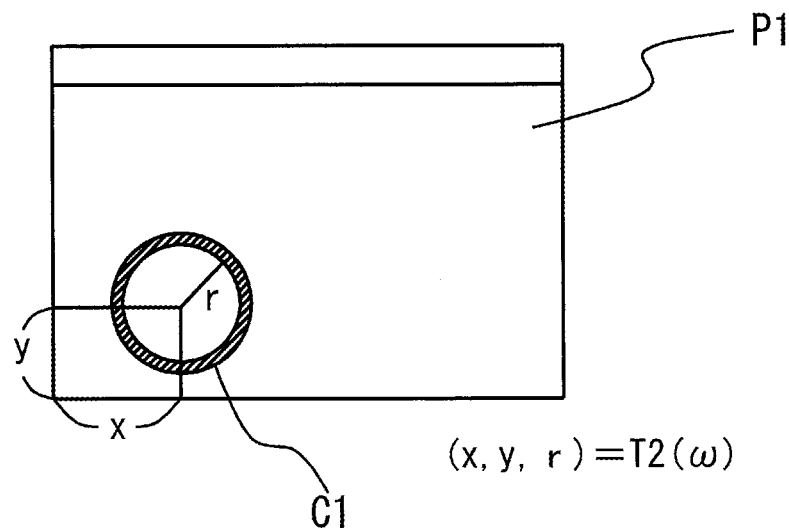
FIG. 7B describes an example of a process of extracting a taught parameter from a feature shape taught by a worker in the feature parameter teaching process according to an embodiment of the present disclosure.

Also, as illustrated in FIG. 7B, when the feature shape is the circle C1, the taught parameter acquiring unit 33 creates a circle using an approximate expression based on a collection of pixels specified by the worker. Then, information of center coordinates (x, y) of the circle C1 with respect to an origin at the reference coordinates and a radius r are extracted as parameters characterizing the circle, and a taught parameter $T2(\omega)$ is calculated based on such data. Here, parameters characterizing a pictorial figure in the input image P1 are not limited to a distance d, a slope $\theta$, coordinates (x, y), and a radius r, but may be other parameters or their combination.

Figure 8:
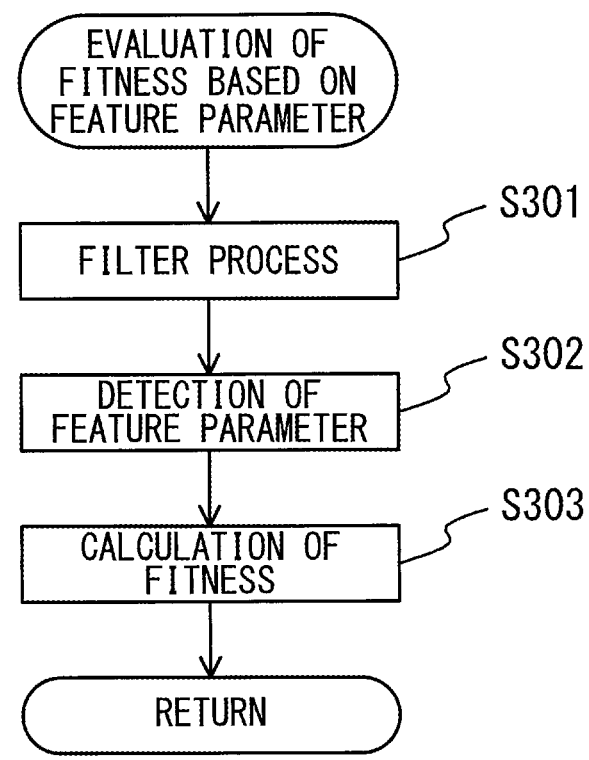
FIG. 8 is a flowchart illustrating an example of a fitness evaluation process in the image processing filter producing method according to an embodiment of the present disclosure.
Figure 9:
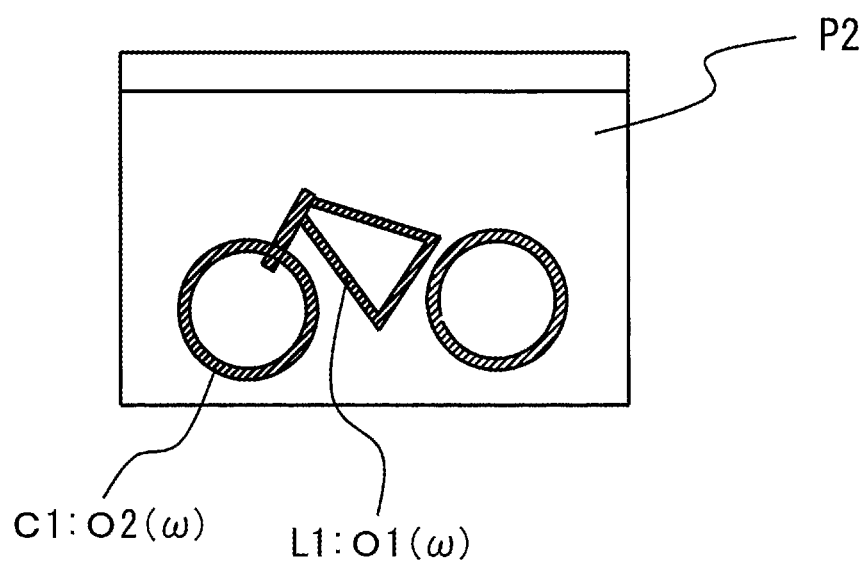
FIG. 9 describes an example of a detected parameter extracting process used in the fitness evaluation process in the image processing filter producing method according to an embodiment of the present disclosure.

Next, the detail of a fitness evaluation process based on the taught parameter and the detected parameter in step S104 will be described with reference to FIG. 8. First, in step S301, the data processing unit 31 processes an input image P1, using a tree structured image processing filter 1 that is to be evaluated, in order to create an output image P2. In step S302, the feature detecting unit detects a detected parameter $On(\omega)$ (here, n is a positive integer) from the output image P2. For example, when the output image P2 illustrated in FIG. 9 is obtained, the shapes of the straight line L1 and the circle C1 included in the output image P2 are detected using Hough transformation. Then, detected parameters $O1(\omega)$ and $O2(\omega)$ are obtained by extracting parameters that identifies the detected shapes.

Here, the detected parameter $On(\omega)$ is associated with the taught parameter $Tn(\omega)$. That is, the detected parameter $O1(\omega)$ identifying the same shape at the same location as the taught parameter $T1(\omega)$ is associated with the taught parameter $T1(\omega)$, by using an index, such as a distance from the same origin coordinates, for example. For example, the detected parameter $O1(\omega)$ of the straight line L1 includes a distance d and a slope $\theta$ in the same way as the corresponding taught parameter $T1(\omega)$. In the same way, the detected parameter $O2(\omega)$ of the circle C1 includes coordinates (x, y) and a radius r in the same way as the corresponding taught parameter $T2(\omega)$.

Then, in step S303, the automatic configuring unit calculates a fitness between the detected parameter $On(\omega)$ and the taught parameter $Tn(\omega)$. A fitness is calculated as a cosine similarity between the corresponding taught parameter $Tn(\omega)$ and detected parameter $On(\omega)$. Specifically, a fitness is calculated by the following formula.

$$\text{fitness} = \frac{T \cdot O}{|T||O|}$$

For example, a fitness is calculated from the taught parameter $T1(\omega)$ of the straight line L1 in the input image P1 and the detected parameter $O1(\omega)$ of the pictorial figure that corresponds to the straight line L1 in the output image P2. In the same way, a fitness is calculated from the taught parameter $T2(\omega)$ of the circle C1 in the input image P1 and the detected parameter $O2(\omega)$ of the pictorial figure that corresponds to the circle C1 in the output image P2. For example, with respect to the circle C1, a fitness is obtained by calculating a cosine similarity in a three-dimensional coordinate system (x, y, z).

Then, if the fitness is equal to or more than a predetermined threshold value, it is determined that a robust image processing filter 1 is produced. This enables comparison and evaluation of the input image P1 and the output image P2, based on the parameters of the straight line component and the circle component. Also, a fitness can be evaluated, even if there is variation of line widths or of taught positions in images.

As describe above, in this embodiment, the fitness of an image processing filter 1 is calculated by comparing feature parameters extracted from images before and after image processing of the image processing filter 1, in order to produce an image processing filter 1 having a tree structure on the basis of genetic programming. Here, the taught parameter $Tn(\omega)$ of the input image P1 and the detected parameter $On(\omega)$ of the output image P2 are used as the feature parameters. Then, two types of parameters $Tn(\omega)$ and $On(\omega)$ are compared to calculate a degree of similarity as a fitness of the image processing filter 1 of tree structure. Thereby, the input image P1 and the output image P2 are compared on the basis of parameters indicating feature shapes in images, in order to reduce the influence of variation of positions and line widths of pixels. As a result, an effective image processing filter 1 is prevented from being dropped out of selection by mistake, and an optimal image processing filter 1 is searched for highly accurately at a high speed.

Also, shortening of learning time and improvement of detection accuracy are expected by improving search accuracy of automatic configuration of the image processing filter 1. Also, a shape in the input image P1 is specified by acquiring a taught parameter $Tn(\omega)$, and therefore accuracy in teaching generates little influence on its learning result, regardless of the skill of a teaching worker.

Features of an input image and an output image can be extracted simply without failure, so as to improve accuracy of evaluation of an image processing filter by comparing an input image with an output image, and so as to improve accuracy in producing an image processing filter.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An image processing filter producing apparatus comprising:
a processor configured to perform a procedure including:
producing a new image processing filter by genetically evolving an image processing filter for processing an input image,
acquiring a first parameter that identifies a shape included in the input image,
producing an output image by processing the input image with the new image processing filter,
acquiring a second parameter that identifies a shape included in the output image,
calculating a fitness of the new image processing filter by comparing the first parameter with the second parameter for cosine similarity, and
ending a process of evolving the image processing filter genetically, when the cosine similarity becomes equal to or larger than a predetermined value.

2. The image processing filter producing apparatus according to claim 1, wherein each of the first parameter and the second parameter includes information of a distance from reference coordinates and a slope of a straight line passing through the reference coordinates as a parameter for identifying a shape of the straight line.

3. The image processing filter producing apparatus according to claim 1, wherein each of the first parameter and the second parameter includes information of coordinates of a center and a radius as a parameter for identifying a shape of a circle.

4. An image processing filter producing method, comprising:
producing, by a computer, a new image processing filter by genetically evolving an image processing filter for processing an input image,
acquiring, by the computer, a first parameter that identifies a shape included in the input image,
producing, by the computer, an output image by processing the input image with the new image processing filter,
acquiring, by the computer, a second parameter that identifies a shape included in the output image,
calculating, by the computer, a fitness of the new image processing filter by comparing the first parameter with the second parameter for cosine similarity, and
ending, by the computer, a process of evolving the image processing filter genetically, when the cosine similarity becomes equal to or larger than a predetermined value.

5. A non-transitory computer-readable storage medium storing an image processing filter producing program that causes a computer to perform a procedure comprising:
producing a new image processing filter by genetically evolving an image processing filter for processing an input image,
acquiring a first parameter that identifies a shape included in the input image,
producing an output image by processing the input image with the new image processing filter,
acquiring a second parameter that identifies a shape included in the output image,
calculating a fitness of the new image processing filter by comparing the first parameter with the second parameter for cosine similarity, and
ending a process of evolving the image processing filter genetically, when the cosine similarity becomes equal to or larger than a predetermined value.

6. The non-transitory computer-readable storage medium according to claim 5, wherein each of the first parameter and the second parameter includes information of a distance from reference coordinates and a slope of a straight line passing through the reference coordinates as a parameter for identifying a shape of the straight line.

7. The non-transitory computer-readable storage medium according to claim 5, wherein each of the first parameter and the second parameter includes information of coordinates of a center and a radius as a parameter for identifying a shape of a circle.

8. The image processing filter producing apparatus according to claim 1, wherein the first parameter identifies a specific shape included in the input image, and the second parameter identifies the specific shape included in the output image.

9. The image processing filter producing method according to claim 4, wherein the first parameter identifies a specific shape included in the input image, and the second parameter identifies the specific shape included in the output image.

10. The non-transitory computer-readable storage medium according to claim 5, wherein the first parameter identifies a specific shape included in the input image, and the second parameter identifies the specific shape included in the output image.

\* \* \* \* \*